Nov. 17, 1931.  G. E. LARRABEE  1,832,488
LINING FOR BEARINGS
Filed Jan. 12, 1928
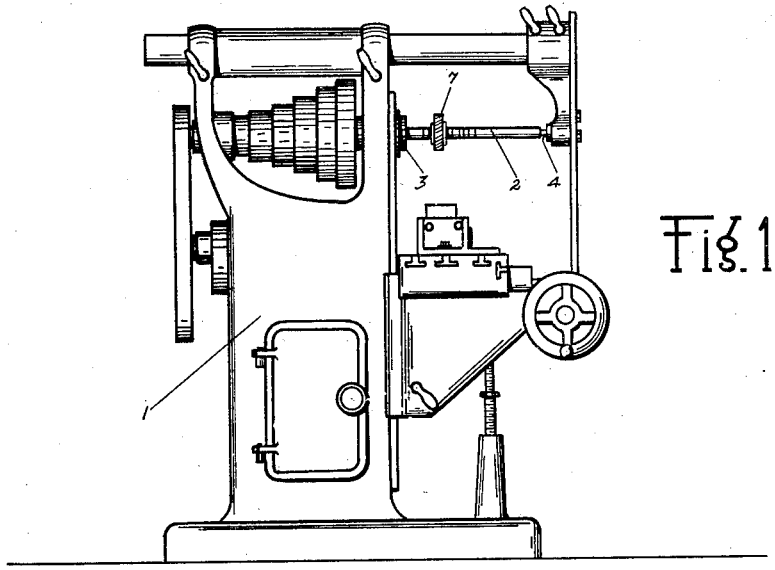
Fig. 1.
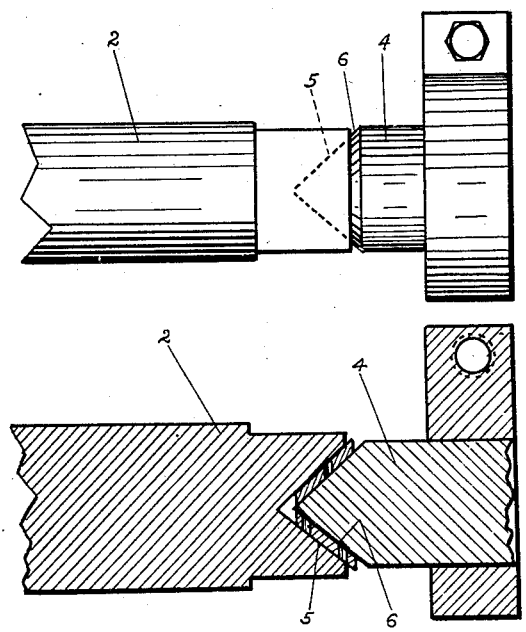
Fig. 2.
Fig. 3.
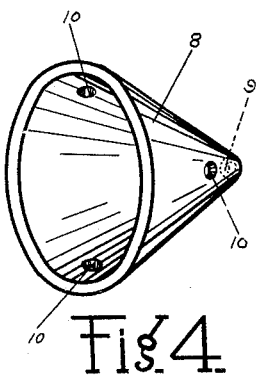
Fig. 4.
INVENTOR.
GEORGE E. LARRABEE.
BY
ATTORNEY Patented Nov. 17, 1931

1,832,488

UNITED STATES PATENT OFFICE

GEORGE E. LARRABEE, OF BINGHAMTON, NEW YORK

LINING FOR BEARINGS

Application filed January 12, 1928. Serial No. 246,306.

My invention relates generally to an antifriction lining for bearings and has particular usefulness in connection with the bearings for arbors of milling machines and the like.

The primary object of my invention is to provide a removable lining for conical shaped bearings whereby the rotating parts, such as the arbor of a milling machine, is provided with a bearing of minimum friction and which contributes largely to the maintenance of the arbor in exact alignment.

A further object is to provide such a lining with means for lubricating the bearing.

Other objects and advantages in details of construction and arrangement of parts will be apparent as the description proceeds, reference now being had to the figures of the accompanying drawings, wherein like reference numerals indicate like parts.

In the drawings:—

Figure 1 is a side elevation of a milling machine, the arbor of which is journaled in a bearing provided with my improved lining.

Figure 2 is a detail side view of the type of bearing in common use at present.

Figure 3 is a detail cross sectional view of one end of an arbor journaled on a bearing, provided with my improved lining.

Figure 4 is a detail perspective view of the lining itself.

Although I have illustrated my invention in connection with the bearing of an arbor for milling machines, it will be clearly understood that the same is not limited thereto but is of wide application and usefulness in the machine art.

The reference numeral 1 refers generally to a milling machine provided with an arbor 2, one end of which is secured in the rotating chuck 3, and the opposite end of which is supported by and rotatably mounted over the end of the adjustable spindle bearing 4.

Ordinarily in bearings of this type, the end of the arbor 2 is provided with a conical shaped recess 5 adapted to receive the conical shaped end 6 of the spindle 4. The difficulty with this construction is that generally both the arbor and spindle 4 are made of steel with the result that when the arbor 2 rotates on the bearing, considerable friction develops not only producing heat at the point of the bearing, but tending to wear either the spindle or the arbor socket, resulting in the arbor becoming out of alignment with detrimental action to the work being performed by the cutter or other tool 7 mounted on the arbor.

In order to overcome this friction and the bearing of similar metals, I provide a lining or sleeve 8 of relatively soft metal such as copper, bronze or brass, which lining is conical in shape and adapted to be received within the socket 5 in the end of the arbor and over the conical shaped spindle at 4. This lining 8 is provided at its small end with an opening 9 and about its sides with a plurality of openings 10 whereby a lubricant dropped upon the bearing may pass through and lubricate both the spindle 4 and the socket 5 in contact with the lining.

By the use of this lining 8, the excessive friction resulting from two metals of the same relative hardness rotating one on the other is overcome and consequently, the likelihood of wear on either the rotating part or the stationary member. Therefore, my improved metal lining, not only reduces the friction, thereby preventing the wear of the bearing and consequent inaccurate alignment of the rotating arbor, but provides a simple and satisfactory means for lubricating the bearing.

This lining may of course be made of any desired size and thickness to accommodate different types and sizes of bearings, and of course is not limited to any specific metal so long as it serves the purpose for which it is intended.

Many changes may of course be made in details of construction without departing from the spirit and scope of my invention. I do not limit myself therefore to the exact form shown and described other than by the appended claims.

I claim:—

1. A bearing comprising a rotating part having a conical recess in one end, a journal therefor extending substantially within said recess for supporting said rotating part, and a conical sleeve of relatively soft material between said rotating part and said journal, the small end of said sleeve being open.

2. A bearing comprising a rotating part having a conical recess in one end, a journal therefor extending substantially within said recess for supporting said rotating part, and a conical sleeve of relatively soft material between said rotating part and said journal, said sleeve having openings through its walls to permit the passage of a lubricant therethrough.

GEORGE E. LARRABEE.